United States Patent
Sears

(10) Patent No.: US 9,452,941 B2
(45) Date of Patent: Sep. 27, 2016

(54) PYROPHORIC IRON SULFIDE TREATMENT USING SODIUM NITRITE

(71) Applicant: Refined Technologies, Inc., Spring, TX (US)

(72) Inventor: Sean Sears, The Woodlands, TX (US)

(73) Assignee: Refined Technologies, Inc., Spring, TX (US)

( * ) Notice: Subject to any disclaimer, the term of this patent is extended or adjusted under 35 U.S.C. 154(b) by 0 days.

(21) Appl. No.: 14/666,500

(22) Filed: Mar. 24, 2015

(65) Prior Publication Data

US 2015/0273533 A1 Oct. 1, 2015

Related U.S. Application Data

(60) Provisional application No. 61/970,773, filed on Mar. 26, 2014.

(51) Int. Cl.
*C01G 49/04* (2006.01)
*C01B 17/02* (2006.01)

(52) U.S. Cl.
CPC ............... *C01G 49/04* (2013.01); *C01B 17/02* (2013.01)

(58) Field of Classification Search
None
See application file for complete search history.

(56) References Cited

U.S. PATENT DOCUMENTS

| | | | | |
|---|---|---|---|---|
| 3,739,007 A | * | 6/1973 | Schwager | C07C 253/30 558/358 |
| 3,761,448 A | * | 9/1973 | Anderson | C09D 161/14 528/145 |
| 5,593,339 A | * | 1/1997 | Yam | B08B 3/06 451/104 |
| 2009/0196930 A1 | * | 8/2009 | Surber | A61K 9/0043 424/489 |
| 2012/0193302 A1 | * | 8/2012 | Matza | C02F 1/722 210/759 |
| 2013/0270157 A1 | * | 10/2013 | Ferrara | C10G 75/04 208/48 AA |

* cited by examiner

*Primary Examiner* — Nicole Blan
(74) *Attorney, Agent, or Firm* — Blank Rome, LLP

(57) ABSTRACT

Pyrophoric material such as iron sulfide is frequently found in refinery equipment. When the equipment is opened to the atmosphere for maintenance, an exothermic reaction can take place that may cause injury to personnel and catastrophic damage to equipment. A process used to treat pyrophoric material uses sodium nitrite injected into a gaseous carrier stream to oxidize iron sulfides to elemental sulfur and iron oxides. The sodium nitrite solution may be buffered to a pH of about 9 with disodium phosphate or monosodium phosphate. A chemical additive that provides a quantitative measure of reaction completion may be added to the treatment solution.

10 Claims, No Drawings

PYROPHORIC IRON SULFIDE TREATMENT USING SODIUM NITRITE

CROSS-REFERENCE TO RELATED APPLICATIONS

This application claims the benefit of U.S. Provisional Application No. 61/970,773 filed on Mar. 26, 2014.

STATEMENT REGARDING FEDERALLY SPONSORED RESEARCH OR DEVELOPMENT

Not Applicable

BACKGROUND OF THE INVENTION

1. Field of the Invention

The present invention generally relates to cleaning chemical process equipment. More particularly, it relates to oxidizing iron sulfide in oil refinery equipment.

2. Description of the Related Art including information disclosed under 37 CFR 1.97 and 1.98

Treating Pyrophoric Material

Spontaneous ignition of iron sulfide either on the ground or inside equipment can occur in all refineries. If this occurs inside equipment like columns, vessels, tanks and exchangers containing residual hydrocarbons and air, the resulting fire and possible explosion can be devastating. Most commonly, pyrophoric iron fires occur during shutdowns when equipment and piping are opened for inspection or maintenance. Instances of fires in crude columns during turnarounds, explosions in storage tanks containing sulfur, crude, or asphalt, vessel over pressurization in, and other safety-threatening events due to pyrophoric iron ignition have been widely reported.

Iron sulfide is one such pyrophoric material that oxidizes exothermically when exposed to air. It can be found in solid iron sulfide scales in refinery units. These iron sulfide scales can be found in the form of pyrite, troilite, marcasite, or pyrrhotite minerals, any of which will react in the presence of oxygen. These scales are formed by the conversion of iron oxide (rust) into iron sulfide in an oxygen-free atmosphere where hydrogen sulfide gas is present. The reaction can be described as:

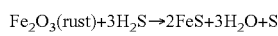
$Fe_2O_3(rust)+3H_2S \rightarrow 2FeS+3H_2O+S$

These conditions commonly exist in closed oil processing equipment made from carbon steel and used to refine high sulfur containing feedstock. The individual crystals of pyrophoric iron sulfides are finely divided, resulting in a very large surface area-to-volume ratio.

When the iron sulfide crystal is subsequently exposed to air, it is oxidized back to iron oxide and either free sulfur or sulfur dioxide gas is formed. This reaction between iron sulfide and oxygen is accompanied by the generation of a considerable amount of heat. This rapid exothermic oxidation is known as pyrophoric oxidation and it can ignite nearby flammable hydrocarbon-air mixtures. The reactions can generally be described by the following chemical equations:

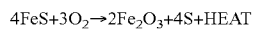
$4FeS+3O_2 \rightarrow 2Fe_2O_3+4S+HEAT$

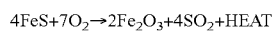
$4FeS+7O_2 \rightarrow 2Fe_2O_3+4SO_2+HEAT$

The pyrophoric iron sulfide (PIS) remains dormant in the equipment until the equipment is shut down and opened for service, exposing the PIS to air and allowing the exothermic process of rapid oxidation of the sulfides to oxides to occur.

To combat the effects of pyrophoric reactions, the industry has employed several standard procedures:

1. Acid Cleaning with a Corrosion Inhibitor and Hydrogen Sulfide Suppressant.

The acid dissolves iron sulfide scale and releases hydrogen sulfide gas. Cleaning/treating with an acid solution can be both effective and inexpensive. There are problems with this approach:

Disposal of the resulting hydrogen sulfide gas can be problematic.

The potential for corrosion can be great when the system contains more than one alloy.

2. Chelating Solutions

These are specially formulated, high-pH solutions that are effective at dissolving the sulfide deposits without emitting hydrogen sulfide. However, specially formulated chelation solutions for this application are currently costly.

3. Oxidizing Chemicals

Oxidizing chemicals convert the sulfide to oxide. Potassium permanganate ($KMnO_4$) has been used commonly in the past to oxidize pyrophoric sulfide. Potassium permanganate (or sodium permanganate) can be added to the equipment in combination with a water rinse, following a chemical cleaning procedure.

Another problem common to all of the existing methods is related to the nature of the equipment to be treated and the nature of the treatment solution. The pyrophoric material will form on all surfaces where hydrogen sulfide comes in contact with iron oxide. These surfaces can be (and typically are) vertical walls and the underside of horizontal features inside the equipment. Prior methods have used liquid solutions that are difficult (if not impossible) to effectively treat these surfaces without filling the equipment completely with the solution. Much of the equipment in a typical refinery is not designed to support the weight imposed by a complete liquid fill and disposal of the large quantity of residual effluent can be problematic. To address this problem, prior chemistries have been applied using steam to atomize or vaporize them so that once dispersed, they can contact all surfaces of the vessel. The problem with this method of application is that prior chemistries are simple mixtures of various constituents that return to their constituent form when vaporized. Consequently there can be no way to ensure that the proper ingredients are adequately applied.

Reactors present a unique problem with respect to pyrophoric material. Historically, reactors have been flooded with water prior to dumping catalyst. More recently, refiners desire to dry dump the catalyst in their efforts to recover more precious metal and reuse the catalyst. Unfortunately, the process stream frequently contains hydrogen sulfide and nickel carbonyl and possibly other pyrophoric compounds. Upon exposure to air, the catalyst may heat up, igniting residual hydrocarbons in the catalyst.

BRIEF SUMMARY OF THE INVENTION

In a first method according to the invention, a sodium nitrite solution is injected into chemical process equipment in steam and/or nitrogen to oxidize iron sulfides to iron oxides. The sodium nitrite solution may be buffered to a pH of about 9 with disodium phosphate or monosodium phosphate.

A chemical additive that provides a quantitative measure of reaction completion may be added to the treatment solution. In one, particular embodiment, the additive is lauryl dimethylamine oxide.

DETAILED DESCRIPTION OF THE INVENTION

According to one embodiment, sodium nitrite may be combined with steam or nitrogen to oxidize iron sulfide. The method may be used to solve the aforementioned problems of iron sulfide treatment and catalyst wet dumping described above.

Sodium nitrite is able to oxidize iron sulfides to elemental sulfur and iron oxide. A balanced chemical equation for such a reaction is shown below.

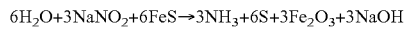

$6H_2O+3NaNO_2+6FeS \rightarrow 3NH_3+6S+3Fe_2O_3+3NaOH$

When only small amounts of sulfide in the form of solid FeS are reacted, the reaction proceeds irreversibly. Experiments conducted on extremely sour brines produce a reaction limit, possibly the result of a reverse reaction, schematically illustrated below.

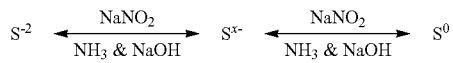

$$S^{-2} \underset{NH_3 \& NaOH}{\overset{NaNO_2}{\rightleftarrows}} S^{x-} \underset{NH_3 \& NaOH}{\overset{NaNO_2}{\rightleftarrows}} S^0$$

The reaction of $NaNO_2$ with $S^{-2}$ produces elemental sulfur ($S^0$) but also produces $NH_3$ and NaOH as by-products, and in the presence of high concentrations of these two alkaline materials, the equilibrium persists. $NaNO_2$ promotes the forward reaction; the reverse reaction is promoted by $NH_3$ and NaOH.

Sodium nitrite stock solutions must be prepared and used at a slightly alkaline pH (e.g., pH=8.75). This may be accomplished by buffering the stock solution with disodium phosphate ($Na_2HPO_4$). In blending a stock concentrate, the phosphate buffering chemical may first be blended with water, and then the sodium nitrite may be added at the end. Sodium nitrite must never experience an excursion into acidic conditions, under which conditions nitric oxide gasses are formed and evolved from solution (NO and $NO_2$).

Pyrophoric iron sulfide will produce heat when introduced to oxygen. Hence, it is impossible to judge whether a vessel has been made safe by simply opening the vessel and making an observation. Thus, an important aspect of the present invention is inclusion of a chemical additive that provides a quantitative measure of reaction completion. This may be accomplished by adding a 1.2% by weight solution of lauryl dimethylamine oxide (LAO) in water, for example, to provide an easily detectable "marker" during treatment. The solution of lauryl dimethylamine oxide may additionally comprise sodium nitrite. Laboratory tests have confirmed that:

1. Sodium nitrite is compatible with LAO
2. A 5% solution by weight of sodium nitrite in water effectively oxidizes iron sulfide
3. A 1.2% solution of LAO allows the reaction progress to be easily measured.

In one exemplary method, after the process equipment is taken out of service and chemically cleaned for hydrocarbons, the entire system remains oxygen free. The system is then put under a positive pressure with steam purging through the equipment. Steam may be injected into the chemical process equipment to heat the equipment to between about 213° F. and about 275° F. at a pressure between about 1 psiq and about 20 psiq.

Once the oil and chemical is removed, the sodium nitrite solution with LAO described above is injected into the steam. The solution is vaporized and becomes entrained in the steam entering the vessel. Bleeder valves are opened at prescribed locations on the vessel and samples tested. When it is determined that a suitable concentration exists at the sample point(s) (e.g., greater than about 400 ppm), the steam is removed and the vessel is allowed to cool.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A method for reducing the amount of iron sulfide in chemical process equipment containing deposits of iron sulfide, the method comprising:
    injecting steam containing a solution of sodium nitrite into the chemical process equipment;
    reacting the deposits of iron sulfide with the sodium nitrite;
    injecting a solution of lauryl dimethylamine oxide;
    monitoring the progress of the method by testing samples withdrawn from the chemical process equipment for the presence of lauryl dimethylamine oxide while continuing the injection of the solution of lauryl dimethylamine oxide; and,
    continuing the injection of steam containing a solution of sodium nitrite and a solution of lauryl dimethylamine oxide into the chemical process equipment until the lauryl dimethylamine oxide is no longer being consumed as indicated by the presence of unreduced lauryl dimethylamine oxide in the testing samples.

2. The method recited in claim 1 wherein the sodium nitrite is in a buffered solution.

3. The method recited in claim 2 wherein the sodium nitrite solution is buffered to a pH of about 9.

4. The method recited in claim 3 wherein the buffer is selected from the group consisting of disodium phosphate and monosodium phosphate.

5. The method recited in claim 3 wherein the buffer comprises disodium phosphate or monosodium phosphate.

6. The method recited in claim 1 wherein the sodium nitrite oxidizes iron sulfide to ferric oxide and elemental sulfur.

7. The method recited in claim 1 wherein the solution of lauryl dimethylamine oxide comprises an aqueous solution of about 1.2 percent by weight lauryl dimethylamine oxide.

8. The method recited in claim 1 wherein the solution of lauryl dimethylamine oxide is injected with the solution of sodium nitrite.

9. The method recited in claim 1 wherein the solution of lauryl dimethylamine oxide additionally comprises sodium nitrite.

10. The method recited in claim 1 further comprising:
    injecting steam into the chemical process equipment to heat the equipment to between about 213° F. and about 275° F. at a pressure between about 1 psig and about 20 psig.

* * * * *